United States Patent Office 3,365,613
Patented Jan. 23, 1968

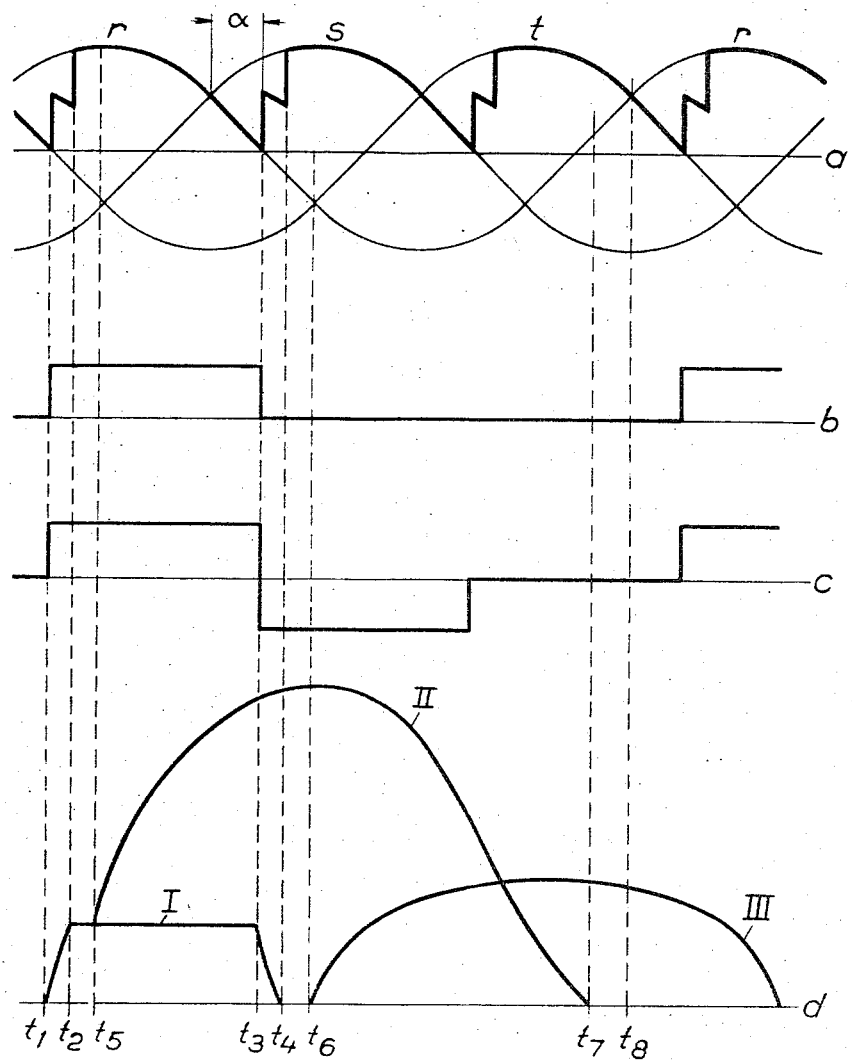

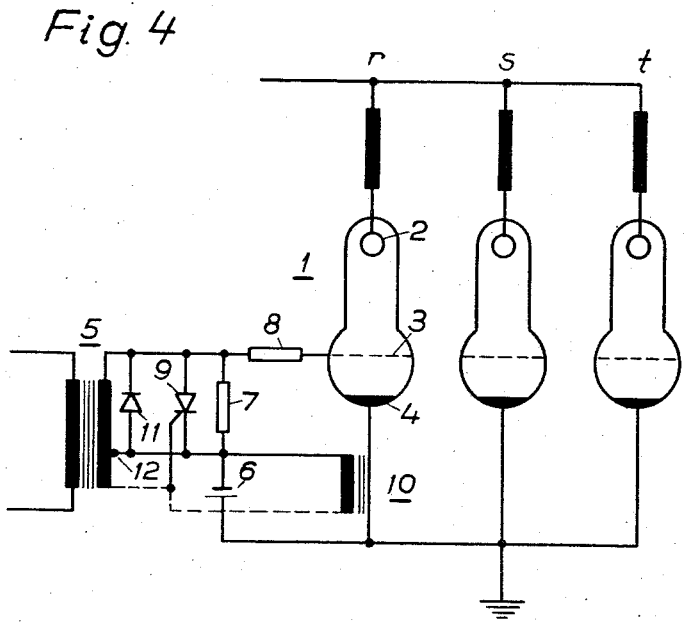

3,365,613
MEANS IN THE CONTROL CIRCUIT OF A RECTI-
FIER VALVE FOR IMPROVING DEIONIZATION
Bertil Hammarlund, Ludvika, Sweden, assignor to
Allmänna Svenska Elektriska Aktiebolaget, Vasteras,
Sweden, a corporation of Sweden
Filed Feb. 15, 1965, Ser. No. 432,757
Claims priority, application Sweden, Apr. 10, 1964,
4,426/64
6 Claims. (Cl. 315—168)

ABSTRACT OF THE DISCLOSURE

In a static converter each rectifier is provided with a control circuit connected to the control electrode and the cathode of the rectifier and comprising a control pulse generating means in series with a bias voltage source. An inductive means is connected to said control circuit and influenced from the main current of the proper rectifier.

---

Figure 1:
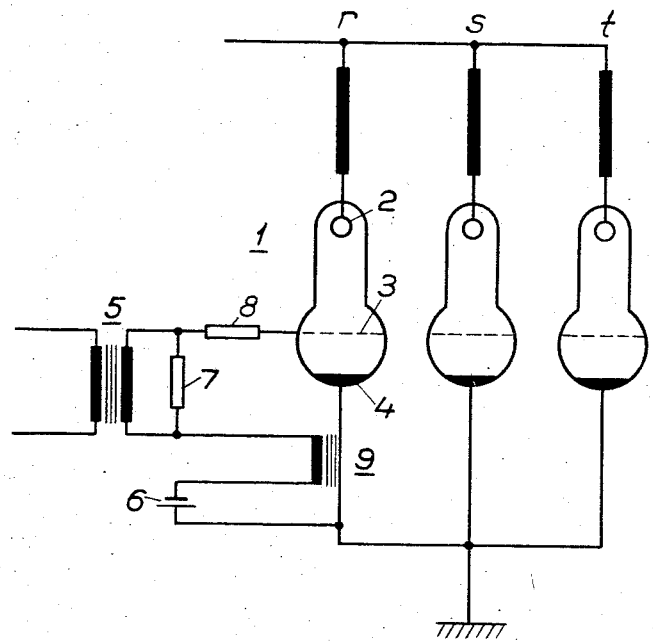

The present invention refers to a means for the control circuit of a rectifier valve in a converter for improving de-ionising conditions in the valve after the end of a conducting interval. The means is particularly significant during abnormal current conditions.

For the correct functioning of a converter with rectifier valves, it is very important that the different valves are effectively de-ionised after the end of a conducting interval, which preferably is obtained with the help of a current from the cathode to the grid of the valve, which current is normally driven partly by the negative grid bias voltage and partly possibly also by the voltage induced during de-magnetising of the grid voltage transformer for the valve. For normal operation it is usually possible to dimension the grid circuit of the valves in such a way that said voltages are able to effectively de-ionise the valves.

At faults in a converter for example in the form of a back-firing in a rectifier valve, a current can, however, occur in another rectifier valve in the conducting direction of the last mentioned valve of such a size and permanency that the valve becomes so strongly ionised that it is not possible with the time available before the anode voltage again becomes positive to de-ionise the valve with the normal de-ionising current. It is thus not possible to block the valve with the help of the negative grid bias voltage. This is particularly undesirable since at such faults it is usually desirable to block the converter completely by disconnection of the control pulses to the different rectifier valves.

In order to improve the de-ionising conditions of the rectifier valve during these circumstances, it is proposed according to the present invention to insert an inductive device in the valve grid circuit which device is influenced by the main current of the valve in such a way that the negative derivative of the main current in said device induces a voltage, which voltage co-operates with and supports the negative bias of the grid circuit and in this way increases the de-ionising current generated by said bias between the cathode and grid of the valve. Said inductive device is formed suitably by a pulse transformer, whose primary side is inserted in the main circuit of the valve and at the most simple embodiment of a means according to the invention, the secondary side of said pulse transformer is connected in series with the negative bias of the grid circuit. The dimensioning of the pulse transformer and the secondary circuit must be so that the time constant of the circuit has such a value that the pulse transformer also gives an additional voltage a certain time after the main current of the valve has become zero.

A further development of the invention is characterised by a resistive circuit connected in series with the negative bias of the grid circuit, at which the secondary side of said pulse transformer is connected over a part of said resistive circuit. Said resistive circuit is suitably made voltage dependent by being built up of so-called varistors.

Figure 2:
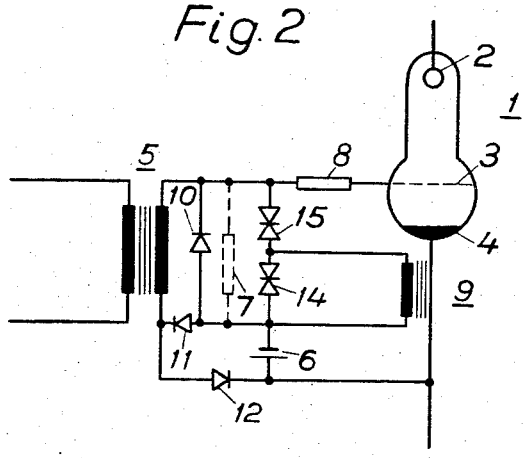

The invention will be further described with reference to the accompanying drawing, where FIGS. 1 and 2 show two different embodiments of an arrangement according to the invention, while FIG. 3 in curve form shows current and voltage conditions in the main and grid circuits of the valves. FIG. 4 shows a third embodiment of the invention.

FIG. 1 shows schematically a one-way three-pulse converter whose three phases are called $r$, $s$, $t$. The phase $r$ contains a transformer winding in series with a rectifier valve 1 with an anode 2, control grid 3 and cathode 4. This rectifier valve is provided with a grid control circuit comprising a grid voltage transformer 5, whose secondary side in series with a grid bias voltage source 6 is connected between the grid of the rectifier valve and cathode. In the grid circuit a resistor 8 is also connected for limitation of the grid current and another resistor 7 parallel with the secondary side of the grid voltage transformer.

The method of operation will be described more closely with reference to FIG. 3 where $3a$ in a known way shows phase voltages for the three phases $r$, $s$ and $t$, while $\alpha$ shows the delay angle of the converter in the case in question. FIG. $3b$ shows the positive control pulses of, for example, 120° length fed to the primary side of the grid voltage transformer 5, while FIG. $3c$ shows the voltage induced in the secondary side of the grid voltage transformer. In FIG. $3d$ the curve I shows the current in the valve 1 during a conducting interval during normal conditions. Commutation between the valve in the phase $t$ and the valve 1 in phase $r$ is introduced at the moment $t_1$ and is completed at moment $t_2$, after which moment the current in the valve 1 becomes constant up to moment $t_3$ when commutation to the valve in the phase $s$ is introduced. This commutation is completed at the moment $t_4$, after which moment the valve 1 must be de-ionised by the help of a current from the cathode 4 to the grid 3. This current appears partly as the de-magnetising current occurring in the secondary winding of the grid voltage transformer 5 and partly because of the grid bias voltage source 6 which is arranged so that after de-ionising it gives the necessary blocking voltage on the grid. The de-ionising current from the cathode 4 of the valve to the grid 3 decreases with decreasing ionising and becomes zero after a certain time, which depends on the magnitude of the valve current during the conducting interval. When the de-ionising current has become zero, the valve 1 is blocked and if the de-magnetising of the grid voltage transformer 5 is still not completed, the de-magnetising current will then go through the resistor 7. This resistor is chosen quite large in order to avoid too great losses in the positive control pulses from the grid voltage transformer.

In case of a back firing at the moment $t_5$ in the recently extinguished valve in the phase $t$, the phases $r$ and $t$ will form a closed circuit. A current will then grow up in this circuit driven forward by the difference voltage between phase $r$ and phase $t$ (see FIG. $3a$), and as the impedance of the circuit is small, said current will have the character of a short circuit current indicated with the curve II in FIG. $3d$. This current increases until the moment $t_6$ when the difference voltage of the phases $r$ and $t$ change polarity, after which moment the current in the closed circuit decreases and becomes zero at for example the moment $t_7$.

In order to restore the normal operation of the converter, it is usual to provide it with some kind of known protection which at a fault of said type blocks the converter completely by disconnecting the control pulses shown in FIG. 3b. The requirement for an effective blocking is that the necessary de-ionising of the different valves is obtained. In FIG. 3 it has been assumed that the main current in the valve 1 becomes zero at the moment $t_7$, at which moment demagnetising of the grid voltage transformer is usually completed. Further it can be seen from FIG. 3a that the difference voltage $r-t$ over the valve 1 becomes positive at the moment $t_8$, at which it is assumed that the back firing valve of phase $t$ is till strongly ionised and therefore unable to block a voltage. At this moment the valve 1 must therefore be sufficiently de-ionised so that it does not re-ignite. Experience has shown however that at high back firing currents it is difficult for the grid bias voltage source 6 alone to bring about the necessary de-ionising in the time interval $t_7-t_8$, as the valve is very strongly ionised by the high current shown in curve II.

In order to improve the de-ionising of the valve during these critical conditions it has been proposed according to the invention to insert the pulse transformer 9 shown in FIG. 1 in the main circuit of the valve and taking into consideration the insulation conditions, preferably in the cathode conductor. The negative current derivative in the main circuit of the valve will induce a voltage in the secondary side of the pulse transformer which is added to the bias voltage source 6 and by means of suitable dimensioning of the pulse transformer it is in this way possible to reach such a high de-ionising current in the valve in spite of the high resistance in resistor 7, that the de-ionising can be accomplished before the moment $t_8$, when the phase voltage becomes positive.

The secondary voltage from the pulse transformer is shown on curve III in FIG. 3d. If the desired effect of the arrangement shall be obtained, it is seen that this voltage must have a positive value a certain reasonable time after the main current of the valve has become zero. In order to secure this the secondary circuit for the pulse transformer must therefore have a certain high time constant.

As the resistance of the resistor 7 is very great, a very high secondary voltage from the pulse transformer 9 is required if sufficiently high de-ionising current in the valve shall be obtained. This can be a disadvantage and therefore in FIG. 2 another variation of an arrangement according to the invention is shown, in which figure the resistor valve 1 together with its grid circuit is shown. The denominations here are the same as in FIG. 1 and the grid circuit has also been provided with three diodes 10, 11 and 12, which complete the circuit in FIG. 1 in order to reach better de-magnetising conditions in the grid voltage transformer. If no account is taken of the pulse transformer 9 and the varistors 14 and 15, the function of such a control equipment would be as follows. During the conducting interval of the valve a voltage is induced in the secondary winding of the grid voltage transformer 5, which voltage is supplied to the rectifier valve via a circuit comprising the valve cathode 4, the bias voltage source 6, the diode 11, the secondary winding of the grid voltage transformer, the resistor 8 and the grid 3. After the end of the conducting interval the voltage is induced in the secondary winding of the grid voltage transformer which voltage gives rise to a de-magnetising current for the grid voltage transformer, which current goes from the secondary winding via the diode 12, the grid bias voltage source 6 and the diode 10. During the de-magnetising time the diode 10 will therefore short circuit the resistor 7 and the bias voltage source 6 will therefore give rise to a de-ionising current in the valve, which current will move in a circuit going from the voltage source 6 to the cathode 4 and further to the grid 3 through the resistor 8 and the diode 10 back to the voltage source 6. In the de-ionising circuit thus only the resistor 8 will enter, so that it is possible for the bias source 6 to bring about a sufficiently high de-ionising current. At the fault described in FIG. 3d, the de-magnetising current from the grid voltage transformer has however ceased before the current shown on curve II has become zero at the moment $t_7$. Owing to this the current from the voltage source 6 must therefore move through the large resistor 7.

With regard now to the pulse transformer 9, this is arranged so that the negative current derivative in the main circuit of the valve in the secondary circuit of the pulse transformer induces a voltage directed so that it causes a current through the diode 10 and back through varistor 15. The voltage is so high that it lowers the resistor value in the varistor 15. The secondary circuit of the transformer 9 is dimensioned so that the current through the diode 10 is greater than the desired de-ionising current in the valve 1. Owing to this the diode 10 will also in this case short circuit the resistor 7 so that the de-ionising current from the voltage source 6 as well as at normal cases will move through the diode 10. In this way it becomes possible for the voltage source 6 also at faults to give a de-ionising current of the necessary size. It is seen that the varistors 14 and 15 will be series connected in relation to the voltage from the secondary side of the grid voltage transformer 5, so that both these series connected varistors may compensate the resistor 7, which for this reason has been drawn with a dotted line. It can also be seen that the voltage from the pulse transformer 9 only has to overcome the resistance in the varistor 15, so that the necessary voltage from the pulse transformer 9 is essentially reduced at the arrangement according to FIG. 2 in relation to the arrangement according to FIG. 1. At grid circuits of the embodiment shown in FIG. 2 the pulse transformer connection according to this figure presents an essential advantage in relation to FIG. 1.

FIG. 4 shows a converter with the phases $r$, $s$, $t$, and in the phase $r$ a rectifier valve 1 with an anode 2, control grid 3 and cathode 4, and a grid voltage transformer 5 connected in series with a resistor 8 for limitation of the grid current and a bias voltage source 6 for providing negative grid voltage during the blocking interval of the valve. Parallel to the secondary side of the grid voltage transformer 5 and in series with the bias voltage source 6, a diode 11 and a resistor 7 are connected, which should be quite large in order not to short circuit the secondary side of the grid voltage transformer at positive control pulse. During normal conditions the rectifier valve 1 is operated substantially as according to FIGS. 1 and 2.

If however a back firing occurs in the valve of the phase $t$ during the conducting interval of the valve 1, the phases $r$ and $t$ will form a closed circuit and the two phase voltages in this circuit will cooperate and therefore cause a current in the closed circuit, which current because of the small impedance in the circuit can rise to the values which are several times the rated current. After a time the sum of said phase voltages will change polarity so that said high current which is almost like a short circuit current will cease. As mentioned before, it is normal at such a fault to block the converter by disconnecting the control pulses to the different grid voltage transformers in a known way not shown, but because of the high ionisation in the valve 1 it is difficult to secure a blocking of this valve within the available time, so that it will probably reignite as soon as its phase voltage becomes positive if no special precautions for its de-ionising are taken.

For this reason according to the invention the impedance 7 is parallel connected with a thyristor 9. The control circuit of this thyristor can either be connected to a part of the secondary winding of the grid voltage transformer 5, namely a part lying between the output point 12 and the end point of the winding or to the secondary side of a pulse transformer 10, whose primary side is inserted in the cathode conductor for the valve 1. In the first case the thyristor 9 will receive control current by means of the de-magnetising current of the grid voltage transformer when the control pulse from this transformer has ceased. Even if the de-magnetising current keeps the diode 11 open at the beginning, current reversing will take place in the combination of the diode 11 and the thyristor 9 when the de-magnetising current has been reduced, so that the thyristor becomes conducting. In the other case said pulse transformer 10 is inserted so that the negative current derivative in the cathode conductor will induce the desired control voltage for the thyristor 9. In either case the thyristor 9 will be conducting at the end of the conducting interval of the valve and thereby short circuit the resistor 7 even if the conducting interval is extended for a long time across the de-magnetising interval. Compared with the resistor 7 the resistor 8 is relatively small and it is therefore possible for the bias voltage source 6 to drive a relatively high current from the valve cathode to its control grid and in that way in a short time to effect the desired de-ionising of this part of the valve, so that according to the invention it is possible to perform the desired blocking of the converter at a fault.

As mentioned, the invention is in the first hand important at faults which give rise to large currents in the conducting direction in a valve, but since the thyristor 9 will always become conducting at the end of the conducting interval of the valve, the invention can also under normal conditions be advantageous by giving greater freedom to the dimensions of the control circuits of the valve, since these can be made in such a way that the de-magnetising current must not necessarily be used for de-ionising.

What is claimed is:

1. In a static converter comprising a number of mercury arc rectifiers, each having a cathode and a control grid, control means for said mercury arc rectifiers, said control means comprising for each rectifier a control pulse generating means and a bias voltage source, means connecting said control pulse generating means and said bias voltage source in series between said cathode and control grid of the rectifier, thereby forming a control circuit for said rectifier, inductive means having an input circuit responsive to the main current of said rectifier and an output circuit operatively connected to said control circuit to produce therein a voltage induced from the negative derivative of said main current, said voltage cooperating with said bias voltage, the connection between said inductive means and said control circuit forming the output circuit of said inductive means, said output circuit having such a time constant that said induced voltage is maintained for a certain time after said main current has decreased to zero.

2. Control means as claimed in claim 1, said inductive means comprising a pulse transformer, the primary side of said pulse transformer being connected to the main circuit of said rectifier, the secondary side of said pulse transformer being connected to said control circuit of said rectifier.

3. Control means as claimed in claim 2, the secondary side of said pulse transformer being connected in series with said bias voltage source.

4. Control means as claimed in claim 2, a resistive circuit connected in series with said bias voltage source, the secondary side of said pulse transformer being connected to a part of said resistive circuit.

5. Control means as claimed in claim 4, said resistive circuit being voltage dependent and including voltage dependent resistors.

6. Control means as claimed in claim 2, said control circuit comprising an impedance element, and an active element connected in parallel to said impedance element having a control circuit connected to the secondary side of said pulse transformer.

References Cited

UNITED STATES PATENTS 2,175,920  10/1939  Schnarz _____ 315—274
2,193,649   3/1940  Schmidt _____ 315—274

JAMES W. LAWRENCE, *Primary Examiner.*

C. R. CAMPBELL, *Assistant Examiner.*